United States Patent [19]

Fudaki

[11] Patent Number: 5,274,887
[45] Date of Patent: Jan. 4, 1994

[54] SWIVEL HOOK ASSEMBLY
[75] Inventor: Tsutomu Fudaki, Kurobe, Japan
[73] Assignee: Yoshida Kogyo K. K., Tokyo, Japan
[21] Appl. No.: 48,506
[22] Filed: Apr. 20, 1993
[30] Foreign Application Priority Data Apr. 20, 1992 [JP] Japan .............. 4-033499[U]

[51] Int. Cl.$^5$ .............................................. A44B 13/00
[52] U.S. Cl. .................................. 24/265 H; 24/318; 24/600.9; 24/905
[58] Field of Search .......................................... 24/265

[56] References Cited

U.S. PATENT DOCUMENTS

| | | | |
|---|---|---|---|
| 4,617,704 | 10/1986 | Kasai | 24/905 |
| 4,665,592 | 5/1987 | Kasai | 24/600.9 |
| 4,868,954 | 9/1989 | Kasai | 24/265 H |
| 4,987,656 | 1/1991 | Sato . | |
| 5,127,137 | 7/1992 | Krauss | 24/265 H |

FOREIGN PATENT DOCUMENTS

| | | |
|---|---|---|
| 1290377 | 3/1969 | Fed. Rep. of Germany . |
| 2673249 | 8/1992 | France . |
| 62-27701 | 7/1985 | Japan . |
| 63-29124 | 7/1988 | Japan . |

Primary Examiner—Victor N. Sakran
Attorney, Agent, or Firm—Hill, Steadman & Simpson

[57] ABSTRACT

A swivel hook assembly comprises a web-engaging member adapted for engaging a web and having a pivotal hole formed therein and a hook member including a hook body and a coupling member for pivotally joining the hook body with the web-engaging member. The coupling member comprises a pair of opposed guide studs, a pair of opposed resilient engaging studs mounted in a circles on one end of the hook body and a bridge block also mounted on said one end of the hook body, disposed between the engaging studs with spaces left therebetween and interconnected with the guide studs, each opposed engaging stud having an outward-projecting prong formed on the upper end, the guide studs being round in their respective outer peripheral surfaces and having the outer round peripheral surfaces run along an imaginary circle which is slightly less in diameter than the pivotal hole, the outward-projecting prongs of the engaging studs being forced through the pivotal hole against the resiliency of the engaging studs and snapped into engagement with the pivotal hole under the resiliency so that the hook member is pivotally mounted on the web-engaging member.

2 Claims, 3 Drawing Sheets

SWIVEL HOOK ASSEMBLY

BACKGROUND OF THE INVENTION

1. Field of the Invention

The present invention relates to a swivel hook assembly for joining webbing or the like to key rings, ropes or other various things.

2. Description of the Prior Art

Typical swivel hook assemblies of the type described are disclosed in Japanese Patent Publication No. 63-29124 and Japanese Utility Model Publication No. 62-27701. The conventional swivel hook assembly according to Japanese Patent Publication No. 63-29124 comprises a rectangular web-engaging frame having an engaging hole and a hook member including a hook body adapted for securing a ring or the like and a coupling member mounted at one end of the hook body for coupling the hook body to the engaging hole of the web-engaging frame. The coupling member comprises a pair of opposed resilient engaging studs mounted substantially in a circle on one end of the hook body. The engaging stud has an outward-projecting prongs on its upper end. The outward-projecting prongs of the engaging studs are slightly greater in diameter than the engaging hole of the web-engaging frame. The outward-projecting prongs of the opposed engaging studs are forced through the engaging hole while compressed against their own resiliency and come into snap-fit engagement with the engaging hole so that the hook member is pivotally mounted on the frame.

The conventional swivel hook assembly according to Japanese Utility Model Publication No. 62-27701 is substantially identical with the preceding one except that the coupling member comprises four (not two) opposed resilient engaging studs mounted in a circle one one end of the hook member. After the outward-projecting prongs of the opposed engaging studs are forced through the engaging hole and come into snap-fit engagement with the engaging hole, a wedging member is wedged into the space between the opposed resilient engaging studs so as to prevent them from being compressed and coming off the engaging hole and thus augment the engagement of the engaging studs with the engaging hole.

However, these conventional swivel hook assemblies suffer from some drawbacks.

In the first type of conventional swivel hook assemblies, the two engaging studs are so thick and resilient that, once engaged with the engaging hole, they are retained in the hole very firmly, but much power is needed to force the two engaging studs through the engaging hole. On the other hand, in the second type, the four engaging studs are so thin and less resilient that little power is needed to force the four engaging studs through the engage hole, but they are likely to come off the hole when the swivel hook assembly is subjected to severe use. For ensuring the engagement of the engaging stud with the hole, this would require use of an extra wedging member, leading to increase in manufacturing cost.

Another disadvantage is shared by both types. The engaging studs, whether two or four, jointly assume a mushroom-like shape as a whole, and each have the outward-projecting prong on its upper end. If the studs were formed thick, this would require the outward-projecting prong to become the larger correspondingly. But, this must be avoided because it would be very difficult if not impossible to force the bulky projecting prongs through the engaging hole. This forces the engaging studs to be formed much smaller diameter than the engaging hole. Consequently, the engaging studs of the hook member are very loosely fitted into the engaging hole, so that they are very likely to be subject to distortion during use of the swivel hook, thus getting eventually damaged.

SUMMARY OF THE INVENTION

With the foregoing difficulties in view, it is therefore an object of the present invention to provide a swivel hook assembly wherein a hook member can be engaged with a web-engaging member very easily and, once engaged, the former can be firmly kept in engagement with the latter and is quite immune from distortion even under severe stress so that the swivel hook assembly works well for a prolonged period of time.

According to the present invention, there is provided a swivel hook assembly comprising: a web-engaging member adapted for engaging a web and having a pivot hole formed therein; and a hook member including a hook body and a coupling member for pivotally joining the hook body with the web-engaging member; the coupling member comprising a plurality of guide studs, a plurality of resilient engaging studs mounted in a circle on one end of the hook body, and a bridge block also mounted on said one end of the hook body, disposed between the engaging studs with spaces left therebetween and interconnected integrally with the guide studs, each engaging stud having an outward-projecting prong formed on the upper end, the guide studs being round in their respective outer peripheral surfaces and having the outer round peripheral surfaces run along an imaginary circle which is slightly less in diameter than the pivotal hole, the outward-projecting prongs of the engaging studs being forced through the pivotal hole against the resiliency of the engaging studs and then coming into engagement with the pivotal hole under the resiliency so that the hook member is pivotally mounted on the web-engaging member.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
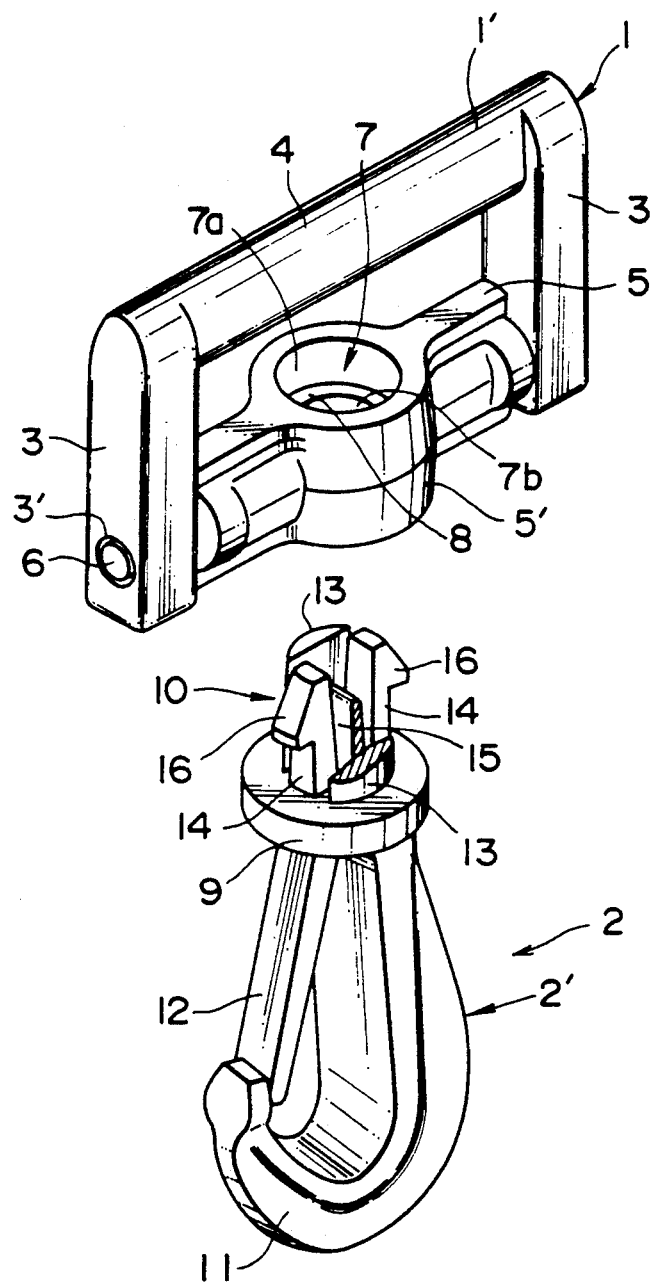
FIG. 1 is an enlarged perspective view of a swivel hook assembly according to the present invention.
Figure 2:
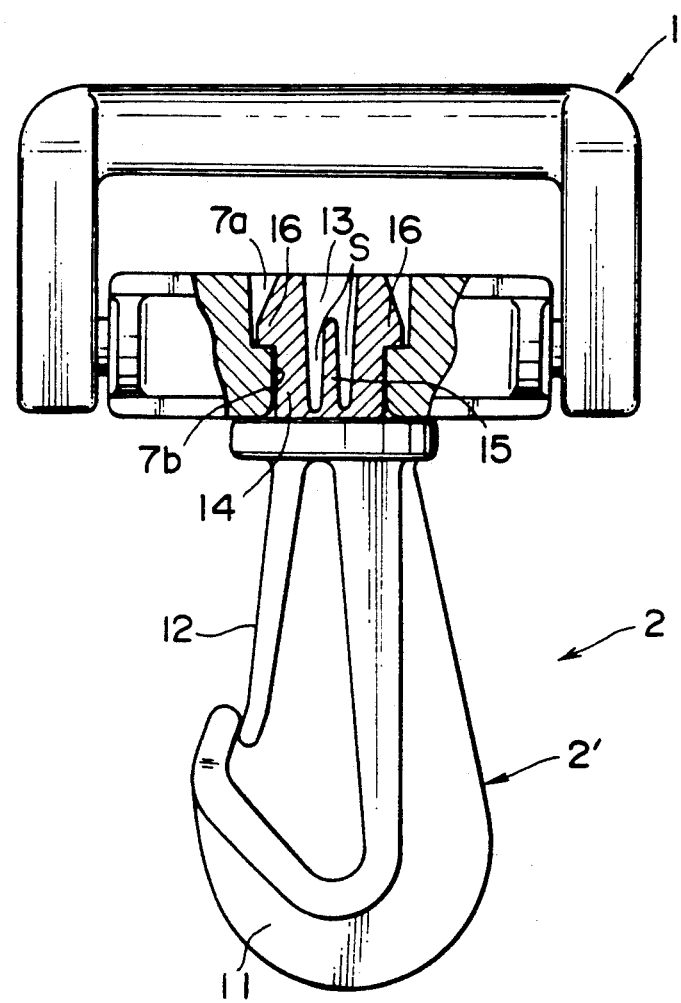
FIG. 2 is a front view, partly cross-sectional, of the swivel hook assembly of FIG. 1.

Referring now to FIGS. 1 and 2, a swivel hook assembly according to the present invention broadly comprises a web-engaging member 1 adapted to attach a belt, flap or other webbings thereto and a hook member 2 adapted to hook room keys or other small articles thereto and pivotally mounted on the web-engaging member 1, both members 1, 2 being molded from suitable synthetic resins.

The web-engaging member 1 is substantially rectangular and comprises a square U-shaped frame 1' and a rotatable crossbar 5 rotatably mounted on the U-shaped frame 1'. The U-shaped frame 1' includes a pair of spaced parallel end bars 3, 3, and a stationary crossbar 4 having its opposed ends connected to the upper ends of the end bars 3, 3. Each end bar 3 has a through hole 3', 3' formed adjacent the lower end. The rotatable crossbar 5 has a small terminal pin 6, 6 formed coaxially on each end thereof. The rotatable crossbar 5 is rotatably mounted on the end bars 3, 3 with the terminal pins 6, 6 rotatably fitted into the respective through holes 3', 3'. The rotatable crossbar 5 has a central bulged portion 5' formed in the middle thereof. The central bulged portion 5' has a through hole 7, which has a pair of upper large-diametered hole 7a and lower small-diametered hole 7b formed coaxially with each other so as to define an inner peripheral step 8 therebetween.

As also shown in FIG. 1, the hook member 2 generally comprises a hook body 2' and a coupling member 10 mounted on end of the hook body 2' for pivotally joining the hook body 2' with the web-engaging member 1. The hook body 2' includes a base disk 9, a hook piece 11 mounted on one side of the base disk 9 and a closing arm 12 also mounted on said one side of the base disk 9 and extending toward the distal end of the hook piece 11. As better shown in FIG. 2, the closing arm 12 is normally urged via its own resiliency outwardly to cause its distal end press against the inner surface of the distal end of the hook piece 11 for retaining key rings, ropes or other small things therein.

Figure 3:
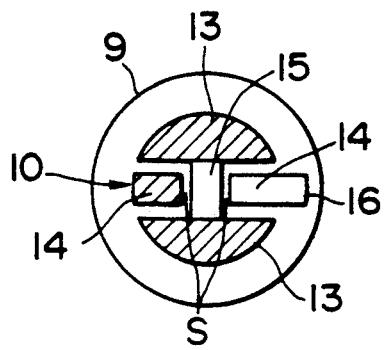
FIG. 3 is a plan view, partly cross-sectional, of the swivel hook assembly of FIG. 1.

As better shown in FIGS. 1 and 3, the coupling member 10 comprises a pair of opposed guide studs 13, 13 and a pair of opposed resilient engaging studs 14, 14 mounted in a circle on the other side of the base disk 9. The opposed guide studs 13, 13 are of two semi-circles, in cross-section, whose bottoms are disposed in separated parallel relation to each other. The opposed engaging studs 14, 14, substantially rectangular in cross-section, are interposed between the opposed guide studs 13, 13. As shown in FIG. 3, the guide studs 13, 13 are round in their respective outer peripheral surfaces and have the outer round peripheral surfaces run along an imaginary circle which is slightly less in diameter than the small-diametered lower hole 7b of the pivotal hole 7 of the web-engaging member 1. As shown in FIG. 2, either of the engaging studs 14, 14 has on its upper end an outward-projecting prongs 16 which is substantially of a right-angled triangle. Another imaginary circle running through the tips of the outward-projecting prongs 16, 16 of the opposed engaging studs 14, 14 is slightly smaller in diameter than the large-diametered upper hole 7a of the pivotal hole 7 of the web-engaging member 1.

As shown in FIGS. 1 through 3, the coupling member 10 further includes a bridge block 15 mounted on said other end of the base disk 9. The bridge block 15 is interposed between the opposed engaging studs 14, 14 with spaces left therebetween and interconnected at its opposed ends integrally with the middles of the guide studs 13, 13, as better shown in FIG. 3. As better shown in FIG. 2, the size of the spaces 3, 3, left between the bridge block 15 and the respective engaging studs 14, 14 is such that the bridge block 15 never prevent the opposed engaging studs 14, 14 from getting compressed to each other against their own resiliency when the outward-projecting prongs 16, 16 of the engaging studs 14, 14 are forced through the small-diametered lower hole 7b.

For joining the hook member 2 with the web-engaging member 1, the coupling member 10 of the hook member 2 is forced through the small-diametered lower hole 7b of the pivotal hole 7 of the web-engaging member 1. To be specific, the outward-projecting prongs 16 of the opposed engaging studs 14 are forced through the small-diametered lower hole 7b while compressed by the inner peripheral surface of the small-diametered hole 7b against the resiliency of the engaging studs 14, until the outward-projecting prongs 16 of the opposed engaging studs 14 pass beyond the small-diametered lower hole 7b, whereupon the outward-projecting prongs 16 are snappingly restored to the original position under the resiliency of the engaging studs 14, thus coming into engagement with the peripheral step 8. Consequently, the hook member 2 is pivotally mounted on the web-engaging member 1. During the thrust of the engaging studs 14 through the small-diametered lower hole 7b, the guide studs 13 come into guiding engagement with the inner peripheral surface of the small-diametered lower hole 7b to thus help the coupling member S as a whole thrust through the small-diametered lower hole 7b very smoothly.

Figure 4:
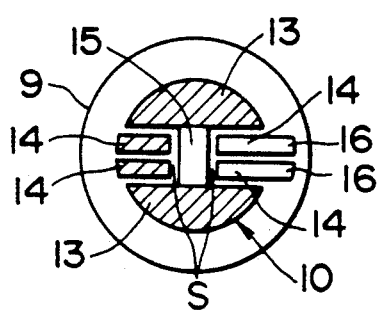
FIG. 4 is a view similar to FIG. 3 but showing another embodiment of the present invention.
Figure 5:
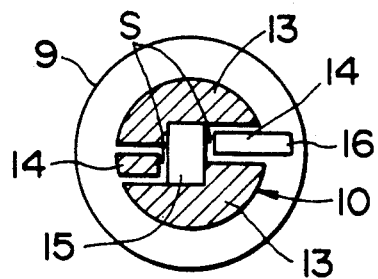
FIG. 5 is a view similar to FIG. 3 but showing still another embodiment of the present invention.
Figure 6:
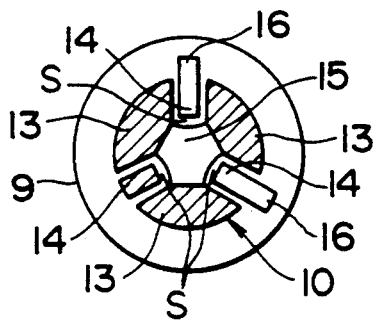
FIG. 6 is a view similar to FIG. 3 but showing yet another embodiment of the present invention.

FIGS. 4, 5 and 6 show a second, third and fourth embodiment, respectively, of the present invention. These embodiments are substantially identical with the preceding embodiment except for the shapes, numbers and positions of the guide studs 13 and the engaging studs 14 constituting the coupling member 10.

According to the second embodiment, as shown in FIG. 4, two pairs of opposed engaging studs 14 are mounted on the disk base 9, instead of the one pair of opposed engaging studs 14 according to the preceding embodiment.

According to the third embodiment, as shown in FIG. 5, the confronting surfaces of the opposed guide studs 13 are offset substantially in their middle. Correspondingly, the opposed engaging studs 14, 14 are arranged offset to each other.

According to the fourth embodiment, as shown in FIG. 6, the coupling member 10 comprises three guide studs 13 and three engaging studs 14 alternately mounted in a circle on the disk base 9. In this embodiment, each guide studs 13 is of sector form in cross-section.

With the construction set forth hereinabove, the engaging studs of the coupling member can be fitted into the hole of the web-engaging member very easily or with little force, since engaging studs are formed thinner. Nevertheless, once engaged with the web-engaging member, the hook member is firmly retained thereto against displacement thereoff since the bridge block would prevent the engaging studs from being compressed even under severe stress tending to pull the hook member from the web-engaging member. This advantageously dispenses with a separate wedging member for ensuring the engagement of the hook member with the web-engaging member.

During the thrust of the engaging studs through the small-diametered lower hole, the opposed guide studs interconnected with the bridge block come into guiding engagement with the inner peripheral surface of the small-diametered lower hole, to thus help thrust the coupling member as a whole through the small-diametered lower hole very smoothly.

Once the hook member is engaged with the web-engaging member, the guide studs well fit in the small-diametered lower hole, so that the coupling member is quite immune from distortion which it would be likely to suffer if it were fitted loosely thereinto. Consequently, the hook member keep rotatably retained to the web-engaging member for a prolonged period of time.

Obviously, various modifications and variations of the present invention are possible in the light of the above teaching. It is therefore to be understood that within the scope of the appended claims the invention may be practiced otherwise than as specifically described.

What is claimed is:

1. A swivel hook assembly comprising:
   a web-engaging member adapted for engaging a web and having a pivot hole formed therein; and
   a hook member including a hook body and a coupling member for pivotally joining the hook body with the web-engaging member; the coupling member comprising a plurality of guide studs, a plurality of resilient engaging studs mounted in a circle on one end of the hook body, and a bridge block also mounted on said one end of the hook body, disposed between the engaging studs with spaces left therebetween and interconnected integrally with the guide studs, each engaging stud having an outward-projecting prong formed on the upper end, the guide studs being round in their respective outer peripheral surfaces and having the outer round peripheral surfaces run along an imaginary circle which is slightly less in diameter than the pivotal hole, the outward-projecting prongs of the engaging studs being forced through the pivotal hole against the resiliency of the engaging studs and then coming into engagement with the pivotal hole under the resiliency so that the hook member is pivotally mounted on the web-engaging member.

2. A swivel hook assembly according to claim 1, the pivotal hole including an upper large-diametered hole and a lower small-diametered hole formed coaxially with each other to thus define a peripheral step therebetween, the outward-projecting prong of the engaging studs being forced through the lower small-diametered hole and snapped into engagement with the upper large-diametered hole.

* * * * *